United States Patent [19]

Russell

[11] Patent Number: 5,026,426

[45] Date of Patent: Jun. 25, 1991

[54] INK COMPOSITIONS HAVING IMPROVED WATERFASTNESS

[75] Inventor: Dale D. Russell, Corvallis, Oreg.

[73] Assignee: Hewlett-Packard Company, Palo Alto, Calif.

[21] Appl. No.: 407,605

[22] Filed: Sep. 15, 1989

[51] Int. Cl.$^5$ ............................................. C09D 11/02
[52] U.S. Cl. ........................................ 106/22; 106/20
[58] Field of Search .................................. 106/20, 22

[56] References Cited

U.S. PATENT DOCUMENTS

| | | | |
|---|---|---|---|
| 3,995,992 | 12/1976 | Défago et al. | 106/22 |
| 4,597,794 | 7/1986 | Ohta et al. | 106/20 |
| 4,605,441 | 8/1986 | Masuda et al. | 106/21 |
| 4,791,165 | 12/1988 | Bearass et al. | 106/22 |

Primary Examiner—William R. Dixon, Jr.
Assistant Examiner—Helene Klemanski

[57] ABSTRACT

Inks for ink-jet printing have improved waterfastness when a low molecular weight nitrile, particularly a nitrile having quaternary or tertiary amine functionalities, is added to the composition.

13 Claims, No Drawings

INK COMPOSITIONS HAVING IMPROVED WATERFASTNESS

TECHNICAL FIELD

The present invention relates to ink compositions suitable for ink-jet printing; more particularly, it relates to ink compositions which have improved waterfastness.

BACKGROUND ART

Thermal ink-jet printers employ a number of resistor elements to expel droplets of ink through a plurality of associated nozzles. Each resistor element is located in a chamber which is filled with ink supplied from an ink reservoir. A nozzle plate, having a plurality of nozzles, or openings, defines one side of the chamber. Each nozzle is associated with a resistor element. Upon energizing a particular element, a droplet of ink is expelled through the nozzle associated with that element toward the print medium. A microprocessor controls the firing of the ink droplets by sending electrical signals via conductive traces to the resistor elements. In this way, alphanumeric and other characters are formed on the print medium.

The tolerances of the nozzles are typically 40 to 60 μm, and it is important that the ink does not clog them. In addition, the resistor elements can be fouled by repeated firings, but they must stand up to 50 million firings over the life of the cartridge for the system to be commercially practical.

In addition, consideration must be given to the interaction of the ink and the print medium. Since printing inks for use with ink-jet printers are usually aqueous solutions and the print medium is usually paper, the art continues to seek compounds that will assist in chemically or physically binding the dye molecule to the paper.

Inks which possess one or more of these desirable properties are known, but there are very few which possess all. Often, an improvement in one property results in degradation of another. Many commercially used inks represent a compromise in an attempt to achieve a satisfactory level of the various properties. Consequently, with these considerations plus the primary need to obtain a good print, materials which are added to ink-jet inks must be selected with great care.

DISCLOSURE OF INVENTION

I have found that the addition of a low molecular weight nitrile to a printing ink improves the waterfastness of several classes of water soluble dyes on paper without adversely effecting the other properties of the ink. The nitriles, especially ones having quaternary or tertiary amine functionalities, will mediate between dye molecules and the cellulose structure of the paper to improve the binding of dye to paper. For example, the nitrile will react with the hydroxyl groups in the paper and the sulfonic acid groups in the dye to bind them chemically. In addition, the nitrile will also react with azo and amine functionalities. The nitrile is one that is soluble in the vehicle.

A printing ink of this invention comprises, by weight, (a) from about 0.05% to about 20% water-soluble dye, (b) from 0% to about 50% water-soluble organic solvent for the dye, (c) from about 0.01% to about 5.0% nitrile, and (d) the balance water.

A preferred concentration of low molecular weight nitrile will be from about 0.02 wt % to about 1.0 wt % and the dye preferably will constitute from about 0.05 wt % to about 10 wt %. Generally, there will be from about 2 to 6-fold excess of nitrile per mol of dye.

BEST MODES FOR CARRYING OUT THE INVENTION

The inks of this invention can be made by dissolving the dye and the nitrile, in either order, in water or water-organic solvent mixture.

Nitriles that can be used in this invention include, but are not limited to cyanoguanidine, cyanoacetamide, cyanoacetic acid, cyanoacetophenone, cyanoacetylurea, cyanoaniline, cyanobenzoic acid, cyanobenzaldehyde, 3-(1-cyanoethyl)benzoic acid,3-cyano-4,6-dimethyl-2-hydroxypyridine, 2-cyanoethyl ether, 1-(2-cyanoethyl)pyrrole, 5-cyanoindole, 2-cyano-6-methoxybenzothiazole, sodium salt of 1-cyanoisourea, 3-cyano-6 methyl-2(1H)-pyridinone, cyanopyridine, 6-cyanopurine, and cyanothiophene., As previously noted, preferred nitriles are those that have quaternary or tertiary amine functionalities. Typical examples are cyanoguanidine, 3-cyano-6-methyl-2-(1H)-pyridinone, cyanopyridine, 1-cyanoisourea, cyanoindole, cyanoacetylurea, 3-cyano-4,6-dimethyl-2-hydroxypyridine, and 1-(2-cyanoethyl)pyrrole.

It is well-known in the art that one may use a wide range of water-soluble dyes in printing inks. For example, azo, methine, triaryl, anthracene, phthalocyanine, xanthine, oxazine, and mix dyes can be used. The water fastness of azo, methine, phthalocyanine, and triaryl dyes, in particular, has been improved by the addition of a nitrile the ink containing such a dye. The amount of dye can constitute as much as 20% by weight of the ink but preferably will be from about 0.05% to about 10%.

The inks may also contain other components commonly used in inks for ink-jet printing. For example, biocides, buffers, surfactants, penetrants, spreading agents, and humectants may be incorporated as desired.

Water-soluble organic solvents that may be used in this invention include, for example, glycols, lower alcohols, formamide, dimethyl formamide, glycerol, ketones, ethers and pyrrolidones.

Printing inks of this invention may be used in conventional ink-jet printers. In the following examples, Hewlett-Packard DeskJet, PaintJet, and QuietJet printers were used.

The waterfastness of the prints was determined as follows:

Checkerboard patterns of one inch squares were printed by alternating a 100% full area with a blank area to obtain a specimen that had a top row of blank-full-blank squares, a second row of full-blank-full squares, and a bottom row of blank-full-blank squares. One pattern was set aside as a standard. Another pattern was subjected to a washing in deionized water for five minutes with vigorous stirring. After the washed pattern was dried, $L^*$, $a^*$, $b^*$ coordinates were measured for the standard and the washed squares, averaging at least four squares. aE was computed as the difference in color between the standard and the washed sample.

All color measurements were made according to ASTM Method D2244-85, using 10° observer, D65 illuminant.

INDUSTRIAL APPLICABILITY

The printing inks of this invention may be used in ink-jet printers, particularly thermal ink-jet printers.

EXAMPLES

EXAMPLE 1

2.0 gms. Carta Turq (Direct Blue 86) was dissolved in 92.5 gms. water and 5.5 gms. diethylene glycol (DEG). The solution was split into two equal samples, and 1.0 gm. cyanoguanidine (CG) was dissolved in one sample. Three sets of four one inch squares of each dye were then printed on "plain" BMDX uncoated free sheets using a Hewlett-Packard printer.

One set of each was compressed between two metal plates at 150° C. for 30 seconds. The heat set sample and a set that was not subjected to heat set were washed by swirling in a beaker of deionized water for five minutes with stirring. Then the changes in L* coordinates ($\Delta L$) were measured using a Minolta Chroma-Meter with the following results:

| Ink | Initial L* | $\Delta L^*$ |
| --- | --- | --- |
| Not heat set: | | |
| Carta Turq | 57.11 | 19.5 |
| Carta Turq w/CG | 53.7 | 5.8 |

Sets that were heat set before washing gave improved $\Delta L^*$ results in comparison with the sets that were washed without heat set.

EXAMPLE 2

An ink comprising by weight:
3% Direct Blue 86 (DB 86)
2% cyano acetic acid (CAA)
5% DEG, and
90% water
was printed on paper as in Example 1. An identical dye, except that the CAA was replaced by its weight of water was also printed on paper. The values for these prints were:

| Ink | Initial L* | $\Delta L^*$ | $\Delta E^*$ |
| --- | --- | --- | --- |
| DB 86 | 44.70 | 36.81 | 49.45 |
| DB 86 w/CAA | 51.69 | 27.23 | 38.94 |

EXAMPLE 3

An ink comprising by weight:
1% Basic Violet 3 (BV3)
0.4% p-cyanobenzoic acid (CBA)
5.5% DEG
3.1% water
and a second ink, identical except that CBA was replaced by an equal weight of water were printed as in Example 1. The values for these prints were:

| Ink | Initial L* | $\Delta L^*$ | $\Delta E^*$ |
| --- | --- | --- | --- |
| BV3 | 34.40 | 2.234 | 7.07 |
| BV3 w/CBA4 | 54.95 | 1.144 | 5.52 |

EXAMPLE 4

Additional inks were formulated (wt %) as follows:

A. 1.2% BV3
5.5% DEG
0.5% CG
92.8% water
B.
0.75% BASF Fastusol Yellow 66 (FY66)
1.0% DB 86
5.5% DEG
1.0% CG
91.8% water
C.
0.5% Basic Green 4 (BG4)
5.5% DEG
1.0% CG
93% water Additional inks were made identical to A, B, and C, except the nitrile in each case was replaced with an equal weight of water. These inks were labelled A', B', and C'. Papers were printed as in Example 1 with each of the six inks, and the value for these prints were:

| Ink | Initial L* | $\Delta L^*$ | $\Delta E^*$ |
| --- | --- | --- | --- |
| A | 42.14 | 22.1 | 38.2 |
| A' | 44.54 | 11.7 | 15.2 |
| B | 53.64 | 14.0 | 23.0 |
| B' | 56.94 | 5.5 | 7.0 |
| C | 40.84 | 16.6 | 16.8 |
| C' | 42.94 | 4.1 | 7.2 |

Thus, there has been disclosed ink compositions having improved waterfastness, by addition of nitriles. It will be apparent to those of ordinary skill in this art that various changes and modifications of an obvious nature may be made, and all such changes and modifications are considered to fall within the scope of the invention, as defined by the appended claims.

I claim:

1. A thermal ink-jet printing ink comprising, by weight:
   (a) from about 0.01% to about 20% water-soluble dye;
   (b) from 0% to about 15% water-soluble organic solvent for said dye;
   (c) from about 0.01 to about 5% nitrile selected from the group consisting of cyanoguanadine, 3-cyano-6-methyl-2-(1H)-pyridinone, cyanopyridine, 1-cyanoisourea, cyanoindole, cyanoacetylurea, 3-cyano-4,6-dimethyl-2-hydroxypyridine, 1-(2-cyanoethyl)pyrrole, cyanoacetamide, cyanoacetic acid, cyanoacetophenone, cyanoaniline, cyanobenzoic acid, cyanobenzaldehyde, 3-(1-cyanoethyle)benzoic acid, 2-cyanoethyl ether, 2-cyano-6-methoxybenzothiazole, 6-cyanopurine, and cyanothiophene; and
   (d) from about 73% to 99% water.

2. A printing ink of claim 1 wherein the nitrile has quaternary amine functionality.

3. A printing ink of claim 1 wherein the nitrile has tertiary amine functionality.

4. A printing ink of claim 1 wherein the nitrile is cyanoguanidine.

5. A printing ink of claim 1 wherein the dye is a water-soluble azo dye.

6. A printing ink of claim 1 wherein the dye is a water-soluble methine dye.

7. A printing ink of claim 1 wherein the dye is a water-soluble phthalocyanine dye.

8. A printing ink of claim 1 wherein the dye is a water-soluble triaryl dye.

9. A printing ink of claim 1 wherein the dye is a triphenyl dye.

10. A printing ink of claim 1 wherein the water-soluble organic solvent is ethylene glycol.

11. A printing ink of claim 9 wherein the dye is a water-soluble triphenyl dye.

12. A thermal ink-jet printing ink comprising, by weight:
   (a) from about 0.05% to about 10% water-soluble azo, methine, phthalocyanine, or triaryl dye;
   (b) from 0% to about 15% water-soluble organic solvent for said dye;
   (c) from about 0.05 to about 2.0% nitrile having quaternary functionality selected from the group consisting of cyanoguanadine and 1-(2-cyanoethyl)-pyrrole; and
   (d) from about 73% to 99% water.

13. A thermal ink-jet printing ink comprising, by weight:
   (a) from about 0.05% to about 10% water-soluble azo, methine, phthalocyanine, or triaryl dye;
   (b) from 0% to about 15% water-soluble organic solvent for said dye;
   (c) from about 0.05 to about 2.0% nitrile having tertiary functionality selected from the group consisting of 3-cyano-6-methyl-2-(1H)-pyridinone, cyanopyridine, 1-cyanoisourea, 3-cyano-4,6-dimethyl-2-hydroxypyridine, and 6-cyanopurine; and
   (d) from about 73% to 99% water.

* * * * *